(No Model.)
R. H. DIXON.
TRACTION WHEEL FOR HARVESTERS.
No. 271,612. Patented Feb. 6, 1883.
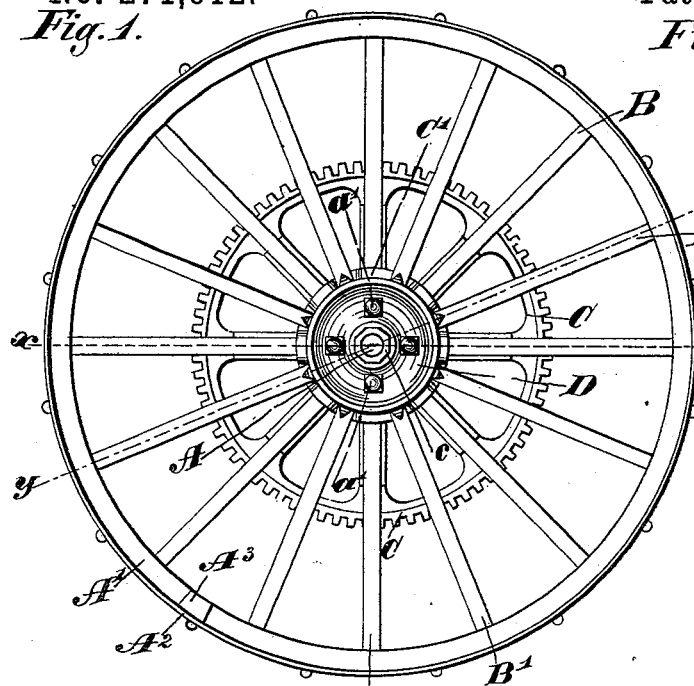
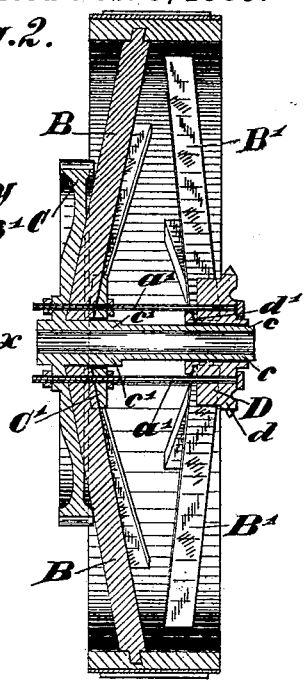
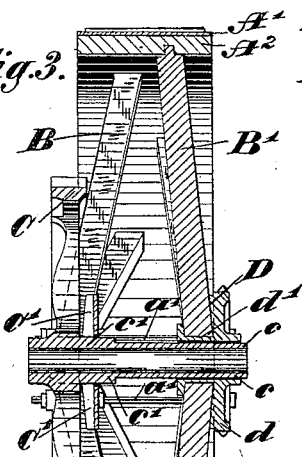
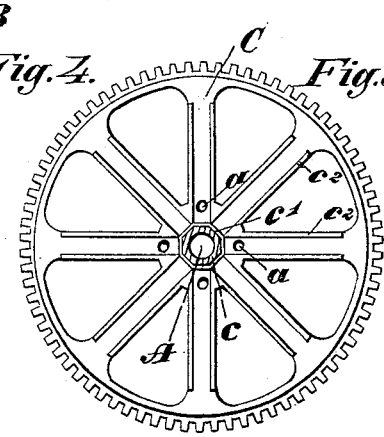
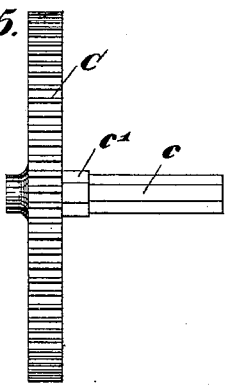
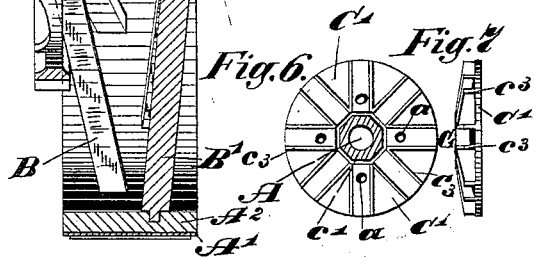
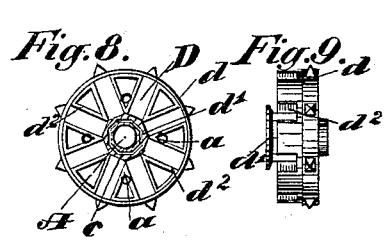
Witnesses:
John B. Kaspare
John F. Steward
Inventor:
Robert H. Dixon

UNITED STATES PATENT OFFICE.

ROBERT H. DIXON, OF CHICAGO, ILLINOIS.

TRACTION-WHEEL FOR HARVESTERS.

SPECIFICATION forming part of Letters Patent No. 271,612, dated February 6, 1883.

Application filed September 21, 1882. (No model.)

*To all whom it may concern:*

Be it known that I, ROBERT H. DIXON, of Chicago, in the county of Cook and State of Illinois, have invented certain new and useful Improvements in Traction-Wheels for Harvesters and similar purposes, of which the following is a full specification, reference being had to the accompanying drawings, in which—

Figure 1 is a side view of a wheel as seen from the right-hand side, or that opposite the gear. Fig. 2 is a sectional view of the wheel as if cut on the line $x\,x$ of Fig. 1. Fig. 3 shows the wheel as if cut on the line of $y\,y$ of Fig. 1. Fig. 4 is a side view of the driving-gear. Fig. 5 is an edge view of the same, showing the sleeve cast integral with it. Figs. 6 and 7 show the cheek-piece. Figs. 8 and 9 are views of the hub D adjustable along the sleeve of the gear C. Fig. 10 is a view of the bolt.

The object of my invention is to overcome certain defects in that class of wheels in the manufacture of which the rim is completed and then filled—that is, the spokes and hubs placed; and its nature consists in providing means for locking the feet of the spokes into their seats in the hub after being placed, in setting up, or after adjustment, as will be set forth. This class of wheels, as heretofore made, have been provided with no other means for securing the spokes at their feet into the hubs than a slight flange upon the inner edge of the seats, which flange I still retain on the hub D. (Shown in Figs. 2, 3, and 9.) This flange cannot be high enough to be of much service in holding the feet of the spokes upon the gear side of the wheel, for the reason that the labor applied to the spokes tends to work them out of their seats. In tightening up the wheel the angle of the spoke changes, so that if the flange were high they would come in contact only with the extreme foot of the spoke.

In the drawings, A is the eye of the wheel; A', the felly; and $A^2$ the tire. The tire is of iron, and the felly, of a single piece of bent wood, is placed therein, and after being expanded to fit the tire is keyed by the wedge $A^3$.

Two series of spokes are used—eight in each—those lettered B being upon the gear side of the wheel, and B' upon the other. The spokes are tenoned into the felly in the usual manner, as shown in the sectional views. The two series of spokes are made to dish inwardly, or placed with the dishing sides together, and it is by such placing of the spokes that the wheel is tightened, as will be set forth in the description of the process of assembling the same.

C is the gear for driving whatever machinery receives its motion from the driving-wheel. The gear is provided with spokes corresponding in number with the B series. They are wider than the thickness of the wooden spokes, and have the flanges $C^2$ at their edges, so as to form a groove, into which the spokes B fit closely. The gear-spokes radiate from a hub, that forms also a bottom seat, $c'$, for the spokes, which is reduced in size, and extended from the said hub as the sleeve $c$ through the hub D, and forming the eye of the wheel. The outer surface of the sleeve is octagonal, and fits into the eye of the hub D, which is also octagonal, by which means the two hubs are retained in a relative radial position. The sleeve is substantially parallel, so that the hub D may slide along it.

$d$ are sprockets on the hub D for driving the reel of the harvester.

$d^2$ are seats in the hub D for the spokes B', really forming three sides of a mortise, the low flange, $d'$, forming, to a limited amount, the fourth.

$a'$ are four bolts, by which the two hubs are held at proper distance from each other, and which are threaded for some distance and nutted, as seen in Fig. 10.

C' is a cheek-piece, of diameter about equal to that of the hubs. It is provided with an octagonal eye of such size as to fit onto the part $c'$ of the sleeve. $c^3$ are flanges, forming between them radial grooves for the inner edges of the spokes B. Four holes are made through this piece to correspond with the four holes $a$ in the hubs.

The process of construction of the wheel is as follows: The tire is made and the felly inserted and expanded therein, the key $A^3$ serving as means for keeping it in expansion. The holes for the tenons of the spokes are laid out and bored in the usual manner. The rim is placed on its side in a proper frame or form and the gear C laid therein a few inches lower than its position, to be in relation to the rim when the wheel is "drawn up," as the tightening of the wheel is termed. The spokes are made of such length as to reach from hub to rim when drawn to the proper dish. It would not be possible to get the spokes into place if the hub and rim were at first put in their final relative position; but with the hub formed by the gear placed lower, or if, speaking of Fig. 2, with the said hub a little farther to the right than shown in relation to the rim, the distance between the seat and the hub and the holes in the rim will be increased, and hence the spokes, being comparatively shorter, will drop easily into very nearly their proper place. After the spokes B are thus laid the hub is raised so far as to take out part of the dish, and hence thrust the tenons a little into the holes in the rim. The disk C' is next laid in place so that its grooves shall pass onto the inner edges of the spokes, and the four belt-holes correspond with those in the hub of the gear. The spokes B' are next laid in the hub D, the spokes fitting so closely into their sockets as to not fall out in handling, and the hub passed onto the end of the sleeve c, and the tenons of the spokes made to enter the holes in the felly. A large screw is now passed through the eye of the sleeve, and with nut and lever the two hubs are made to approach each other to the proper distance, and the wheel thus made tight. The bolts are next inserted, passing through all of the holes a in the different parts. After passing through D, a nut is run well up on the bolt, and it then passes through the disk, the spokes B, and finally through the holes in the gear C. The outer nuts are then placed on the bolts and run snugly down, forming a permanent fastening for the hubs in relation to each other. When this is done the large screw used for drawing the parts into final position may be removed. The disk C' is next drawn firmly onto the spokes B by the nuts $a^3$, and the spokes are thus firmly held in the grooves of the gear-spokes.

As the wheel when in labor revolves, and resistance is applied to the gear, the tendency is great to twist the spokes B out of their seats, and it is found in practice that such results often take place by the spokes becoming loose from shrinkage or constant jar, and even though the spokes are in the grooves of those of the gear and set bracing, the tendency of the strain is such as to work them out of place and then twist the filling out of the wheel. The tendency to loosen the spokes B' is not great, because no strain other than that of supporting is brought upon them. Because of this liability to become loose, the wheels are so constructed as to be capable of "taking up." In such an event the nuts $a^3$ are run up somewhat and the hubs drawn closer by the nuts $a^2$ until the spokes are again tight, and the nuts $a^3$ are then run down to carry the cheek to place to again clamp the spokes B. In this will be recognized not only means for tightening the spokes in the rim, but means for clamping the feet of the spokes into the hub and the grooves of the gear-spokes.

What I claim is—

1. In a traction-wheel, the combination, with the sleeve c, provided with the gear-wheel C, disk C', and hub D, adjustable on said sleeve, of the series of spokes B', stepped in said hub D, the series of spokes B, clamped between the gear-wheel C and disk C', means for drawing the two series of spokes toward each other at their inner ends, and independent means for clamping the series B between the wheel C and disk C', substantially as described.

2. The sleeve c, the grooved gear-spokes radiating therefrom, the correspondingly-grooved disk, adjustable on the said sleeve, and the double-nutted bolts as means for securing the spokes at their feet in the said grooves independent of the distance that the two hubs are held relatively to each other by the said bolts, substantially as set forth.

ROBERT H. DIXON.

Witnesses:
JOHN B. KASPARI,
JOHN F. STEWARD.